United States Patent Office 2,995,144
Patented Aug. 8, 1961

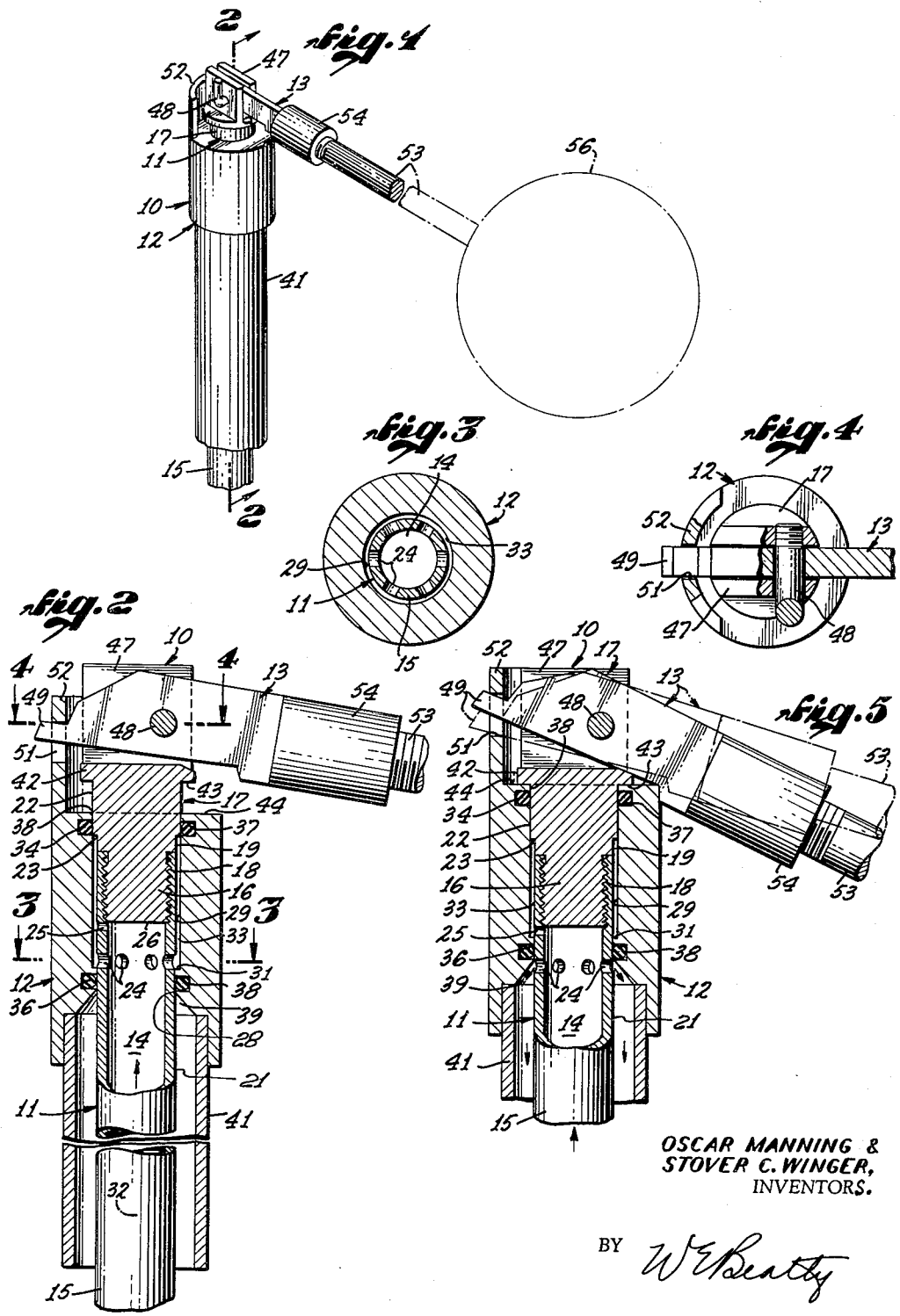

2,995,144
SNAP ACTION FLOAT VALVE
Oscar Manning, 13524 Hartland St., Van Nuys, Calif., and Stover Carl Winger, 4904 5th Ave., Los Angeles, Calif.
Filed Aug. 18, 1958, Ser. No. 755,495
3 Claims. (Cl. 137—422)

This invention relates to a snap action float valve, and more particularly to a valve for shutting off inlet fluid pressure to a tank or other container, which may be actuated by means of a float member caused to elevate and lower in response to the level of the fluid in the tank.

An object of this invention is to utilize the fluid pressure in the inlet to effect a snap-acting or closing action of the valve to shut off flow of fluid under pressure therefrom.

An object of this invention is to utilize the fluid pressure in the inlet to effect a snap-acting or closing action of the valve to shut off flow of fluid under pressure therefrom.

The invention takes advantage of the fact that when the valve is open, the static fluid pressure is substantially zero, increasing as the valve closes and reaching a maximum when the valve is closed. The invention provides a piston area to be acted on by such static pressure, such action being effected by an auxiliary port so spaced from the main ports as to be open to the inlet pressure at all times, the auxiliary port communicating with the piston area at all times whereas the main port is open to the piston area only as the valve is closing, the main port being cut off from the piston area as the valve approaches open position, the auxiliary port at this time relieving the previously built up pressure on the piston area in accordance with the reduced static pressure when the valve is open. Also, during the closing movement of the valve, the static pressure is built up as the main port approaches its closed position, and during this time the auxiliary port communicates the resulting increasing static pressure to the piston area so that the more the valve is shut off, the greater the force tending to shut it off.

It is another object of this invention to utilize the rising level of fluid within the tank, being filled through the valve from the inlet, to initiate a closing action of the valve and to utilize the fluid pressure in the inlet, (a) to accelerate the closing action, thereby effecting a snap-acting movement to shut off the fluid pressure, and (b) to maintain the valve closed.

This invention further provides a shut-off valve which may be actuated by manual means, by the rising and falling of fluid level within a tank being filled, or by other suitable means, such as timing devices, or the like, and one which is economical to manufacture, is readily assembled, and is capable of mass production.

These and other objects of this invention will be more apparent from the following drawings, detailed description, and appended claims.

In the drawings:

FIG. 1 is a perspective view, in elevation, showing a valve designed and constructed in accordance with this invention;

FIG. 2 is an enlarged, foreshortened, vertical, cross-sectional view, as taken substantially along a line 2—2 of FIG. 1, with parts shown in elevation;

FIG. 3 is a horizontal cross-sectional view as taken on a line 3—3 of FIG. 2;

FIG. 4 is a horizontal cross-sectional view taken substantially along a line 4—4 of FIG. 2; and FIG. 5 is a vertical cross-sectional view, similar to FIG. 2, showing parts thereof in a changed position.

Referring more particularly to the drawings, there is shown, by way of illustration, a valve, generally designated by the numeral 10, comprising an inlet pipe or tube 11 which functions as the stationary stem means for the valve 10, having thereon a sleeve valve member 12, functioning to direct and control the fluid pressure of the inlet pipe 11, and an actuator means 13 for effecting an axial movement of the sleeve valve 12.

The valve 10, as herein illustrated, will be described in particular reference to use as a shut-off valve in a water tank wherein the desired level of water in the tank is to be constantly maintained, whereby the valve opens when the water level drops to admit more water into the tank and shuts off when the desired level of the water has been reached.

The stem means 11 comprises a stationary inlet pipe 15 which is adapted to be secured at one end thereof to receive fluid under pressure into the interior 14 thereof, the pipe 15 being closed at its upper end as by a reduced end 16 of a fitting 17 is removably secured to the pipe 15 as by a threaded engagement 18 therewtih. The fitting 17 includes an intermediate portion 19 which has an outer diametrical dimension substantially equal to that of the outer surface 21 of the inlet 15, being coextensive therewith, and an enlarged upper cylindrical surface 22, substantially coaxial with the outer surfaces 19 and 21 forming an innwardly or downwardly forcing annular shoulder 23 which acts as a stationary piston area for piston area 31 on the sleeve valve 12 to produce the snap action and closing action referred to above. A plurality of radial ports or openings 24 are provided transversely of the pipe 15 axially spaced from a bottom surface 26 of the reduced end 16 of the fitting 17, and communicating between the interior 14 of the pipe 12 and the exterior thereof.

A second port 25 of reduced diameter is provided in the pipe 15, adjacent the bottom wall 26 of the fitting 17 and spaced from the openings 24 by an amount to bridge the O-ring 36 when the valve is open as shown in FIG. 5, for the purpose described above.

The sleeve valve 12 is slidingly disposed on the stem means 11 for axial movement thereon, for controlling the flow of fluid under pressure from the interior of the inlet pipe 15, to either shut off the flow, as in FIG. 2, or permit flow therefrom and into a tank, as in FIG. 5. The sleeve 12 includes: a bore 28 having a sliding fit with the external surface 21 of the pipe 15 and a counter-bore 29, having a sliding fit with the enlarged cylindrical surface 22 of the fitting 17, the counter-bore 29 being appreciably longer in length than the bore 28, and forming an annular shoulder 31 acting as a piston area to snap the valve closed and maintain it closed, as above described.

The inner surface of the counter-bore 29, the outer surfaces 19 and 21 of the fitting 17 and pipe 15 respectively, and the inwardly-facing shoulders 23 and 31 of the fitting 17 and sleeve 12 respectively, define an annular chamber 33 between the sleeve 12 and the stem means 11. The chamber 33 is sealed from the exterior of the sleeve 12 by means of sealing means in the form of O-ring packings 34 and 36 of circular cross section and of resilient, pliable material such as rubber, neoprene, or the like, residing in complementary grooves 37 and 38, respectively, of the sleeve 12. The O-ring packing 34 seals the chamber 33 from the exterior of the valve at an upper end 38 while the O-ring 36 seals the chamber 33 from the exterior of the valve at the lower end 39 of the sleeve means.

It will now be more apparent from the foregoing description, that the sleeve 12 is adapted for sliding axial movement on the stem means 11, whereby the chamber 33 is positioned to control the flow of fluid under pressure in the interior 14 of the inlet pipe 15. In the position of the sleeve 12 in FIG. 2, the ports or passages 24 and 25 communicate between the interior 14 of the inlet pipe 15 and the chamber 33. The chamber 33, being sealed at each end by the O-ring sealing means 34 and 36, does not permit flow of the fluid from the valve 10 into extension 41 leading to the tank.

In FIG. 5, wherein the sleeve means 12 is illustrated in an upper position relative to the stem means 11, the ports 24 communicate between the interior 14 of the inlet pipe 15 and the end 39 of the sleeve 12, below the O-ring packing 36, whereby fluid under pressure is permitted to flow into the end 39. The end 39 may be conveniently enlarged and directed into an extension 41 of the sleeve to direct the flow of the fluid beneath the level of the water in the tank. The port 25 in FIG. 5, remains in communication between the interior 14 of the inlet pipe 15 and the chamber 33 at all times. In this position, the passage 25 is inactive, and has no effect upon the operation of the sleeve 12 inasmuch as the fluid pressure is relieved through the end 39. The port 25 previously acted to bleed the pressure in chamber 33, as the static pressure in pipe 15 drops during the opening of ports 24.

To limit the upward axial movement of the sleeve 12, the fitting 17 is preferably provided with an outwardly extending flange 42 forming a shoulder 43 for abutment with an upper surface 44 of the end 38 of the sleeve 12.

The actuator means 13 is pivotally secured to an upper bifurcated extension 47 of the fitting 17 as by means of a transverse pin 48 or the like. The actuator means 13 includes an outwardly extending finger 49 which extends through a slot 51 of an upwardly extending arcuate, or otherwise shaped extension 52 of the sleeve 12. The slot 51 is preferably appreciably longer in length than the width of the finger 49 to provide a lost motion action between the actuator means 13 and the sleeve 12, for a purpose to be hereinafter described.

In order that the level of the fluid within the tank may control the actuator means 13, a rod 53 may be threadedly or otherwise secured at one end thereof to an end 54 of the actuator means 13 opposite the finger 49, and secured as to a float 56, shown in broken lines in FIG. 1, which may be constructed in a conventional manner, having sufficient buoyancy to float on the surface of the water in the tank, thereby rising and falling with the level of the water.

When the level of the water in the tank is low and the float 56 is low, the sleeve valve 12 of the valve 10 is in an elevated position illustrated in FIG. 5, wherein the ports 24 communicate between the interior 14 of the inlet pipe 15 and the exterior of the sleeve valve 12 to permit flow, as indicated by the arrows, through the extension 41 to fill the tank. As the water level rises, the actuator means 13 pivots around the pivot pin 48 of the fitting 17 to lower the finger 49, the finger 49 pressing against the bottom edge of the slot 51 to push the sleeve valve 12 downwardly. As the sleeve valve 12 moves downwardly, the O-ring packing 36 is caused to pass over the ports 24 and progressively close them off. As the ports 24 are being closed off, the pressure which has been relieved through the ports 24 and into the tank, begins to build up within the chamber 33, and the increasing static pressure within the pipe 15 acts within the chamber 33, on the piston area 31 to impart an increasing force on the sleeve valve 12 in a downward direction, snapping the sealing O-ring 36 downwardly past ports 24 to shut off the flow of the fluid. When closed, the valve is urged closed by fluid pressure through port 25 on piston area 31. The downward movement of the sleeve 12 is arrested by the abutment of an upper edge of the slot 51 with the finger 49.

Subsequent emptying of the fluid from the tank causes the finger 49 to lift upwardly against the upper edge of the slot 51 to raise the sleeve 12 and thereby move the sealing means 36 over the passage 24 and upwardly thereof, as seen in FIG. 5, to uncover the passages 24 and permit fluid to flow from the interior 14 of the pipe 15 into the sleeve 41.

A lost motion of the finger 49 within the slot 51 is desired in the adaptation of the valve 10 to a float control, to provide a short period of time for the fluid to empty from the tank before additional fluid is permitted to refill the tank; such lost motion being desirable in instances where rapid emptying, as by a dump valve (not shown), is desired.

The sleeve valve 12 is in a cylindrical form, with cylindrical inner and outer surfaces suitable for manufacture on an automatic screw machine, having (aside from a bore for the upper end of the sleeve 41, and the flare at the lower end 39) the following cylindrical bores, namely a bore 28 having a sliding fit on the pipe 15, a larger counter bore 29 which extends from the piston area or shoulder 31 to the upper surface 44 of the sleeve valve, and a still larger partial counter bore for the inner surface of the extensions 52 which provide a slot 51 forming a part of the coupling with the float rod or actuating means 13.

While we have herein shown and described our invention in what we have conceived to be the most practical and preferred embodiment, it is recognized that departures may be made therefrom within the scope of our invention which is not to be limited to the details disclosed herein but is to be accorded the full scope of the claims so as to embrace any and all equivalent devices.

We claim:

1. A float valve comprising relatively movable inner and outer hollow valve parts, said inner valve part having an inlet, said inner valve part also having a main port and spaced above therefrom an auxiliary port, said outer valve part comprising a sleeve, said sleeve having a stepped bore having concentric cylindrical surfaces having upper and lower annular grooves, the upper groove being in a portion of said sleeve at a certain bore, said lower groove being in a portion of said sleeve of a smaller bore, upper and lower resilient O-rings of substantially circular cross section in said grooves respectively, said sleeve having an outlet below said lower O-ring, the junction of said certain bore and smaller bore providing a shoulder acting as a piston area which assists in moving said sleeve to closed position, said auxiliary port communicating with said piston area at all times, float means for operating said sleeve to shift said lower O-ring from one side to the other of said main port, the static pressure building up on said piston area during initial movement of said sleeve by said float operating means, said static pressure and said initial movement acting to shift said sleeve towards closed position, and a lost motion connection in said operating means for causing said sleeve thereafter to operate with a snap action, under action of said static pressure, independently of said operating means.

2. A valve comprising relatively movable inner and outer hollow valve parts, said inner valve part having an inlet, said inner valve part also having a main port and spaced above therefrom an auxiliary port, said outer valve part comprising a sleeve, said sleeve having a stepped bore having concentric cylindrical surfaces having upper and lower annular grooves, the upper groove being in a portion of said sleeve at a certain bore, said lower groove being in a portion of said sleeve of a smaller bore, a resilient O-ring of substantially circular cross section in each of said grooves, said inner hollow valve part having an outside diameter on which said lower O-ring slidingly fits, a plug fitting in the upper end of said inner valve part, said plug having an outside diameter larger than said inner valve part, said upper O-ring slidingly fitting on said plug, said sleeve having an outlet below said lower O-ring, the junction of said certain bore and smaller bore providing a shoulder acting as a piston area which assists in moving said sleeve to closed position, said auxiliary port communicating with said piston area at all times, and float means for operating said sleeve to shift said lower O-ring from one side to the other of said main port, said sleeve having an upper end having a partial bore larger than said certain bore and providing the inner surface of an extension at the upper end of said sleeve, said extension forming a part of the means for operating said sleeve, the junction of said certain bore and said larger bore providing an upwardly facing stop shoulder and a co-operating downwardly facing stop shoulder on said plug, said operating means including a bifurcated extension on said plug above its said stop shoulder and an operating rod having a pivotal support in said bifurcated extension, said rod having an outwardly extending finger and said sleeve extension having a co-operating slot, said slot being longer in length than the width of said finger to thereby provide lost motion action between said sleeve and said operating means.

3. A valve comprising relatively movable inner and outer hollow valve parts, said inner valve part having an inlet, said inner valve part also having a main port and spaced above therefrom an auxiliary port, said outer valve part comprising a sleeve, said sleeve having a stepped bore having concentric cylindrical surfaces having upper and lower annular grooves, the upper groove being in a portion of said sleeve at a certain bore, said lower groove being in a portion of said sleeve of a smaller bore, a resilient O-ring of substantially circular cross section in each of said grooves, said inner hollow valve part having an outside diameter on which said lower O-ring slidingly fits, a plug fitting in the upper end of said inner valve part, said plug having an outside diameter larger than said inner valve part, said upper O-ring slidingly fitting on said plug, said sleeve having an outlet below said lower O-ring, the junction of said certain bore and smaller bore providing a shoulder acting as a piston area which assists in moving said sleeve to closed position, said auxiliary port communicating with said piston area at all times, and float means for operating said sleeve to shift said lower O-ring from one side to the other of said main port, said sleeve having an upper end having a partial bore larger than said certain bore and providing the inner surface of an extension at the upper end of said sleeve, said extension forming a part of the means for operating said sleeve, the junction of said certain bore and said larger bore providing an upwardly facing stop shoulder and a co-operating downwardly facing stop shoulder on said plug, said sleeve and its said extension being a single piece of material.

References Cited in the file of this patent

UNITED STATES PATENTS

| | | |
|---|---|---|
| 515,699 | Weeden | Feb. 27, 1894 |
| 737,955 | Nelson | Sept. 1, 1903 |
| 2,176,494 | Garske | Oct. 17, 1939 |
| 2,271,419 | Egan | Jan. 27, 1942 |
| 2,815,925 | Fisher | Dec. 10, 1957 |

FOREIGN PATENTS

| | | |
|---|---|---|
| 1,097,717 | France | of 1955 |